United States Patent

Besuyen et al.

[11] Patent Number: 6,117,059
[45] Date of Patent: Sep. 12, 2000

[54] METHOD OF MANUFACTURING A FILTRATION BAG

[75] Inventors: John A. Besuyen, Penfield; Richard K. Buckley, Canadaigua; Eric J. Kuzniar, Scottsville, all of N.Y.; Sylvio J. Mainolfi, Roxbury, Conn.

[73] Assignee: Branson Ultrasonics Corporation, Danbury, Conn.

[21] Appl. No.: 09/188,159

[22] Filed: Nov. 7, 1998

[51] Int. Cl.⁷ ........................................................ B31B 1/64
[52] U.S. Cl. .......................... 493/209; 493/374; 493/379; 493/389
[58] Field of Search ............................ 53/134.2, DIG. 2; 156/580.1, 580.2, 73.1; 493/186, 209, 374, 379, 389

[56] References Cited

U.S. PATENT DOCUMENTS

| | | | |
|---|---|---|---|
| 3,554,845 | 1/1971 | Billett et al. | 156/580.1 |
| 3,555,974 | 1/1971 | Davis | 493/203 |
| 3,920,504 | 11/1975 | Shoh et al. | |
| 4,588,390 | 5/1986 | Heitele et al. | 493/209 |
| 4,690,722 | 9/1987 | Flood | 156/580.2 |
| 5,167,740 | 12/1992 | Michaelis et al. | 156/73.1 |
| 5,236,543 | 8/1993 | Riedel | 493/209 |
| 5,460,844 | 10/1995 | Gaylor | 53/134.2 |
| 5,571,370 | 11/1996 | Selberg et al. | 493/209 |
| 5,620,542 | 4/1997 | Avila et al. | 53/DIG. 2 |

*Primary Examiner*—Eugene Kim
*Attorney, Agent, or Firm*—Polster, Lieder, Woodruff & Lucchesi, L.C.

[57] ABSTRACT

The method of manufacturing a filtration bag for a liquid comprises placing two flexible thermoplastic sheets adapted to filter a liquid upon one another, and welding the sheets together along a desired seam line by vibration welding using tool means which forcibly engage the superposed sheets along the desired seam line.

5 Claims, 1 Drawing Sheet

METHOD OF MANUFACTURING A FILTRATION BAG

BACKGROUND OF THE INVENTION

This invention relates to the manufacture of filtration bags for filtering liquids, such as water. Bags of this type are used in various industries and are made by seaming together two flexible sheets of a material suitable for filtering purposes.

In the past, seaming has been accomplished by stitching or sewing the sheets together. Sewing uses consumables, i.e. thread, and leaves pin holes in the material through which unfiltered liquid can escape. The use of adhesives is slow, is expensive, and produces inconsistent results.

Therefore, there has been the need to manufacture filtration bags in a more reliable and inexpensive manner, minimizing labor costs, yet providing highly consistent and reliable results. Of particular importance are leak-proof joints, uniform and repeatable results, elimination of consumables and retention of pliability of the manufactured bag.

These and other objects have been achieved by the present invention using a welding process in which sheets of thermoplastic material are vibration welded together along a desired seam line for forming a bag.

BRIEF SUMMARY OF THE INVENTION

This invention discloses a method of manufacturing a filtration bag wherein two thermoplastic sheets adapted to filter a liquid are welded together along a desired seam line for forming a bag using reciprocating translating motion for causing, responsive to the dissipation of frictional energy, melted thermoplastic material at the desired seam line. Upon the cessation of the motion, the melted material cools and solidifies to form a welded seam. The process is carried out by a commercially available vibration welding apparatus which is fitted with appropriate tool means for forcibly engaging the sheets along the desired seam line.

One of the principal objects of this invention, therefore, is the provision of a new and improved method of manufacturing filtration bags for liquids.

Another important object of this invention is the provision of an improved method for manufacturing filtration bags for liquids in a relatively simple manner and without the use of consumable materials, and without the creation of pin holes.

A further important object of this invention is the provision of a new and improved method for manufacturing filtration bags by providing leak-proof welded seam lines which join two superposed flexible sheets.

Further and still other objects of this invention will become more clearly apparent from the following description when taken in conjunction with the accompanying drawings.

DETAILED DESCRIPTION OF THE INVENTION

Figure 1:
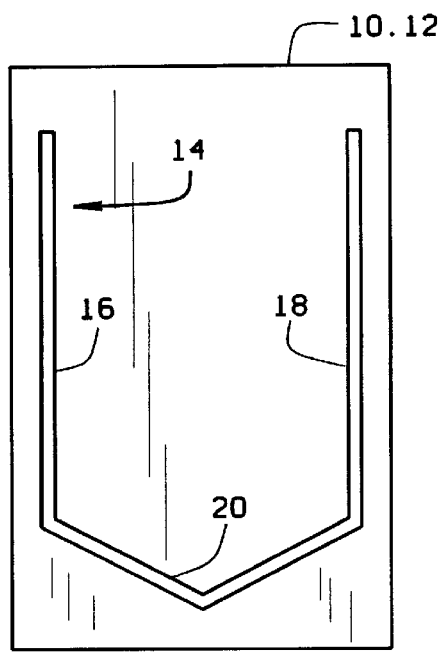
FIG. 1 is a plan view of two sheets disposed upon one another from which a filtration bag is manufactured.
Figure 2:
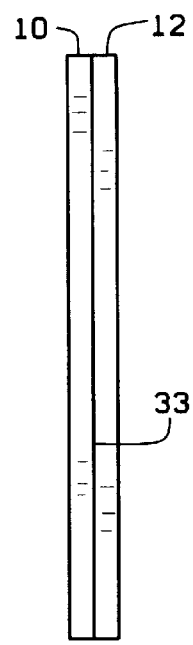
FIG. 2 is a side view of FIG. 1.

Referring now to the figures and FIGS. 1 and 2 in particular, numerals 10 and 12 refer to two flexible sheets of thermoplastic material disposed upon one another, suitable for filtering liquids, such as water. The sheets most suitably comprise, as what is termed, needle punch felt made from polypropylene or polyester material. In a typical example and without implying any limitation, each sheet has a thickness of about 2.3 mm and the finished bag is 84 cm long by 26 cm wide. In order to manufacture a filtration bag from the superposed sheets 10 and 12, the sheets need to be welded together along a continuous seam line designated generally by numeral 14, comprising lines 16 and 18, forming the sides of the bag, and a "V"-shaped seam line 20, forming the bottom portion of the bag. In an alternative design, the bottom may be rounded.

Welding the sheets along the desired seam lines 16, 18 and 20 is accomplished most suitably by a vibration welding apparatus as shown in U.S. Pat. No. 3,920,504 issued to A. Shoh et al, dated Nov. 18, 1975, entitled "Friction Welding Apparatus". Apparatus of this type are available from Branson Ultrasonics Corporation, Danbury, Conn. 06813, Model No. VW4L or WV6L. The apparatus uses reciprocating translating motion (vibrations) between the workpieces to be welded, thereby producing frictional heat, which causes thermoplastic material to melt and subsequently to solidify responsive to the cessation of the vibratory motion.

Figure 3:
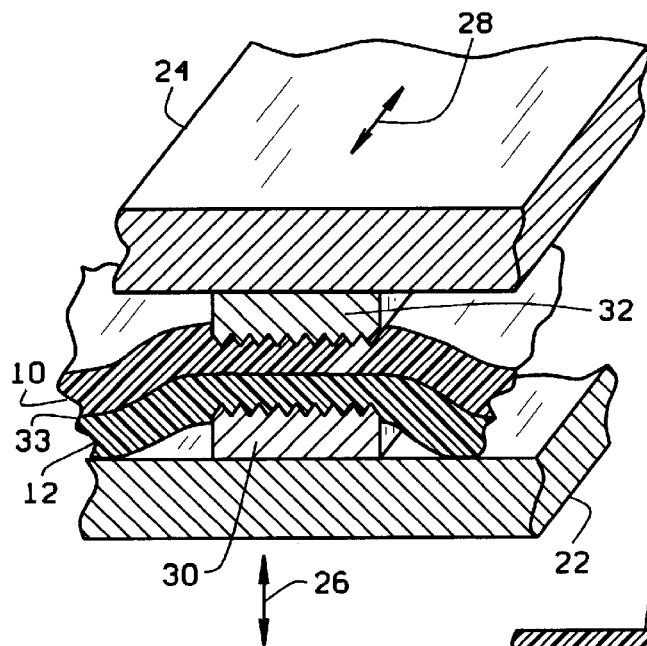
FIG. 3 is a view showing, in part, the apparatus for welding two sheets together along a desired seam line.

A friction or vibration welding apparatus of this type includes, as shown in FIG. 3, a lower member 22, movable in the vertical direction as noted by arrow 26, and an oppositely disposed upper member 24, movable in the longitudinal direction as noted by arrow 28. For inserting a workpiece between the members, the member 22 is moved away from the upper member 24, thus causing an opening. For welding, force means, not shown, provide a force upon the member 22 to cause a forced engagement between the sheets 10 and 12 at the desired seam line. The member 24 is movable longitudinally, arrow 28, by being coupled to electromagnetic means as shown in the patent to Shoh et al supra, for undergoing reciprocating translating motion. This motion causes the required friction between the sheets for producing heating and melting of the thermoplastic material starting at the interface surface 33 between the sheets.

The member 22 is provided with tool means 30 engaging the exposed side of sheet 12, and the member 24 is provided with tool means 32 for engaging the exposed side of sheet 10 along the seam lines. Additionally, as clearly shown, each tool means is provided with a rough textured surface, such as small serrations or knurls, for grippingly engaging the respective sheets with which the tool means are in contact. The tool means 30 and 32 have a width substantially equal to the width of the weld seam 14 and a length commensurate with the seam line.

Figure 4:
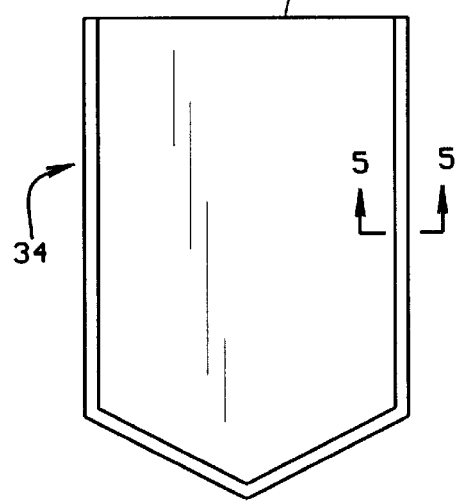
FIG. 4 is a plan view of a completed bag.
Figure 5:
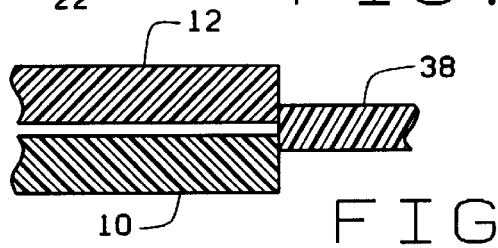
FIG. 5 is a sectional view along line 5—5 in FIG. 4.

For achieving a weld, the sheets 10 and 12 are inserted between the members 22 and 24. Member 22 is brought into engagement with the sheet 12 and a force is applied to the member 22, thereby causing each sheet to be in forced engagement with its respective member. As the forced engagement prevails, the upper member 24 is subjected to a longitudinal reciprocating motion, arrow 28, causing relative translating motion between the sheets along the plane of the interface surface 33 of the sheets. Responsive to the dissipation of frictional energy, melted thermoplastic material is produced and upon the cessation of the motion the melted thermoplastic material solidifies to produce a weld between the sheets 10 and 12 at the area engaged by the tool means, i.e. the seam lines 16, 18 and 20. The lower member 22 then is lowered, arrow 26, and the welded sheets are removed from the apparatus. Finally the excess material is trimmed to provide a bag 34, FIG. 4, which is welded along three sides, but has an open top 36. FIG. 5 shows a section along line 5—5 in FIG. 4, wherein numeral 38 indicates the welded seam.

In a typical example and using material as stated above, the apparatus is adjusted for a clamp force of ten to fifteen kN, frequency of the vibrations is 220 Hz, peak-to-peak amplitude of the vibrations is 1.8 to 2.0 mm, and weld time ranges from 4.5 to 8 seconds. It will be apparent that a certain amount of experimentation is required to optimize the parameters for a particular material, size of the bag and the vibration machine used. The heretofore stated values are provided merely for illustrative purposes and to better understand the present invention.

While there has been described and illustrated a preferred embodiment of our invention, it will be readily apparent to those skilled in the art that certain changes and modifications may be made without departing from the principle of this invention, which shall be limited only by the scope of the appended claims.

We claim:

1. A method of manufacturing a filtration bag comprising:

providing a pair of oppositely disposed members, one of said members adapted for reciprocating translating motion relative to the other of said members, each member being provided with tool means having a textured surface for grippingly engaging flexible sheet material disposed between said members along an intended seam location on the material;

disposing a pair of superposed flexible sheets made of thermoplastic material suitable for filtering a liquid between said members and causing forced engagement of said sheets by said tool means at said intended seam location;

providing for a time period said one member to undergo reciprocating translating motion relative to the other member in a plane substantially parallel to the sheet material engaged by said tool means for causing, responsive to the dissipation of frictional heat generated by the relative motion of the sheets resulting from the relative motion between the members, a seam between said sheets at the location engaged by said tool means;

removing said seamed sheets from between said members; and trimming excess sheet material extending beyond the seam.

2. The method of manufacturing a filtration bag as set forth in claim 1, said thermoplastic sheets comprising polyester material.

3. The method of manufacturing a filtration bag as set forth in claim 1, said thermoplastic sheets comprising polypropylene material.

4. The method of manufacturing a filtration bag as set forth in claim 1, said seam line comprising a pair of spaced side seam lines joined by a "V"-shaped bottom seam line.

5. The method of manufacturing a filtration bag as set forth in claim 1, said seam being a continuous line.

* * * * *